(12) United States Patent
Wang et al.

(10) Patent No.: US 11,963,182 B2
(45) Date of Patent: Apr. 16, 2024

(54) RADIO CODE BLOCK TRANSMISSION BASED ON DCI EXTENSION

(71) Applicant: Telefonaktiebolaget LM Ericsson (publ), Stockholm (SE)

(72) Inventors: Jun Wang, Ottawa (CA); Xixian Chen, Ottawa (CA); Dongsheng Yu, Ottawa (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 495 days.

(21) Appl. No.: 17/299,864

(22) PCT Filed: Dec. 12, 2018

(86) PCT No.: PCT/IB2018/059958
§ 371 (c)(1),
(2) Date: Jun. 4, 2021

(87) PCT Pub. No.: WO2020/121032
PCT Pub. Date: Jun. 18, 2020

(65) Prior Publication Data
US 2022/0086810 A1    Mar. 17, 2022

(51) Int. Cl.
*H04W 72/23*    (2023.01)
*H04L 5/00*    (2006.01)

(52) U.S. Cl.
CPC ........... *H04W 72/23* (2023.01); *H04L 5/0044* (2013.01)

(58) Field of Classification Search
CPC .............................. H04W 72/23; H04L 5/0044
See application file for complete search history.

(56) References Cited

U.S. PATENT DOCUMENTS

2018/0092070 A1 * 3/2018 Liao .................... H04L 1/0028

FOREIGN PATENT DOCUMENTS

WO    2018144560 A1    8/2018

OTHER PUBLICATIONS

International Search Report and Written Opinion dated Oct. 31, 2019 for International Application No. PCT/IB2018/059958 filed Dec. 12, 2018, consisting of 20-pages.
3GPP TS 36.213 V15.1.0; 3rd Generation Partnership Project; Technical Specification Group Radio Access Network; Evolved Universal Terrestrial Radio Access (E-UTRA); Physical layer procedures (Release 15); Mar. 2018, consisting of 56-pages.
3GPP TS 38.214 V15.0.0; 3rd Generation Partnership Project; Technical Specification Group Radio Access Network; NR; Physical layer procedures for data (Release 15); Dec. 2017, consisting of 71-pages.
(Continued)

*Primary Examiner* — Elton Williams
(74) *Attorney, Agent, or Firm* — Weisberg, I.P. Law

(57) ABSTRACT

A method in a wireless device is provided. The method includes: receiving a downlink signal, wherein the downlink signal includes a Physical Downlink Control Channel (PDCCH) and a Physical downlink Shared Channel (PDSCH), the PDCCH having first downlink Control Information (DCI) indicating at least second downlink control information (DCI) in the PDSCH; and performing one of encoding and decoding user data in the PDSCH based on the first DCI and second DCI. A wireless device implementing this method is provided as well.

14 Claims, 12 Drawing Sheets

(56) References Cited

OTHER PUBLICATIONS

3GPP TSG RAN WG1 Meeting #90bis R1-1717064; Title: DCI contents and formats in NR; Agenda Item: 7.3.1.4; Source: Huawei, HiSilicon; Document for: Discussion and decision; Date and Location: Oct. 9-13, 2017, Prague, Czech Republic, consisting of 10-pages.
3GPP TSG RAN WG1 Meeting #90bis R1-1718280; Title: Remaining issues on CBG-based transmission for NR; Agenda Item: 7.3.3.3; Source: Wilus Inc.; Document for: Discussion/Decision; Date and Location: Oct. 9-13, 2017, Prague, CZ, consisting of 6-pages.
3GPP TSG RAN WG1 Meeting AH 1801 R1-1802486; Title: TBS determination; Agenda Item: 7.1.3.3.1; Source: NTT Docomo; Document for: Discussion; Date and Location: Feb. 26-Mar. 2, 2018, Athens, Greece, consisting of 4- pages.
3GPP TS 38.213 V15.3.0; 3rd Generation Partnership Project; Technical Specification Group Radio Access Network; NR; Physical layer procedures for control (Release 15); Sep. 2018, consisting of 101-pages.

* cited by examiner

RADIO CODE BLOCK TRANSMISSION BASED ON DCI EXTENSION

CROSS-REFERENCE TO RELATED APPLICATION

This application is a Submission Under 35 U.S.C. § 371 for U.S. National Stage Patent Application of International Application Number: PCT/IB2018/059958, filed Dec. 12, 2018 entitled "NEW RADIO CODE BLOCK TRANSMISSION BASED ON DCI EXTENSION," the entirety of which is incorporated herein by reference.

TECHNICAL FIELD

The present description generally relates to wireless communication systems and more specifically to code block transmission based on extended Downlink Control Information (DCI).

BACKGROUND

In Long Term Evolution (LTE), at the network side, a Media Access Control Packet Data Unit (MAC PDU) is sent to the Physical layer (PHY) processing as one transport block (TB) which is then divided into multiple code blocks (CBs), each of them has its own Cyclic Redundancy Check (CRC) and is independently encoded. At the User Equipment (UE) side, the CBs within one TB are also independently decoded and verified with their respective CRCs, which means some of the CBs can be CRC-OK, but the other CBs may fail in decoding. However, the Hybrid Automatic Repeat reQuest (HARQ) feedback is based on TB instead of CB, due to the Physical Uplink Control Channel (PUCCH) format limit. This means that, when one CB fails in decoding, the whole TB, in which the failed CB is included along with all the other CBs, has to be retransmitted again.

In the Fifth Generation New Radio (SGNR), in order to provide a larger throughput, the Low Density Parity Check (LDPC) coding scheme has been introduced in the Physical Downlink Shared Channel/Physical Uplink Shared Channel (PDSCH/PUSCH). This will allow to increase each CB size to the maximum of 8448 bits and support hundreds of CBs in one TB. In this context, the existing TB-based HARQ mechanism is unacceptable due to its low efficiency. To resolve the issue, SGNR introduced a new Code Block Group (CBG)-based HARQ mechanism which applies the HARQ feedback in unit of CBG instead of TB, so that a network node (e.g. gNB) needs to retransmit only the CBGs containing the CBs that are not acknowledged, instead of retransmitting the whole TB. By so doing, the HARQ efficiency can be greatly improved. The CBG-based HARQ mechanism 100 is illustrated in FIG. 1. For example, a TB 110 comprises 8 CBs, denoted as CB0 to CB7. The 8 CBs are grouped together into 3 CBGs, e.g. CBG0, CBG1 and CBG2. In the initial transmission 120, TB 110 is transmitted. Let's assume that CB0 fails in decoding (e.g. CB0 is not acknowledged). Then, the network node will perform a retransmission 130, i.e. it will retransmit CBG0, the code block group that contains CB0.

In the CBG-based solution, each retransmission may include different number of CBs so that its actual payload size also varies accordingly. To provide an accurate indication of the actual payload size in each retransmission, a new field is added in the Downlink Control Information (DCI). The new field is referred to as Code Block Group Transmission Information (CBGTI). This new field has 8 bits and is used to indicate which CBGs are included in the current retransmission. Furthermore, to make sure that the TB size is unchanged in the retransmissions, the existing Modulation and Coding Scheme (MCS) field of the DCI is used to calculate the original TB size (including all the CBs) according to the following formula, regardless of the number of CBs present in the retransmission.

$$N_{info} = N_{RE} * R * Q_m * v \qquad \text{formula (1)}$$

where $N_{RE}$ is the effective Resource Element (RE) number, R is the code rate, $Q_m$ is the modulation order and v is the layer number, $N_{Info}$ represents the TB size. Among the parameters, $R*Q_m$ is defined as the RE efficiency, referring to the normalized channel capability per RE, and can be fetched from table 5.1.3.1-2, in 3GPP 38.213 using the 5-bit MCS index of the DCI. The 5-bit MCS index means that at most 32 different efficiency ranks/levels are supported.

The allocated Physical Resource Blocks (PRBs) in retransmissions, i.e. $N_{RE}$, is probably different from the allocated PRBs in a new transmission. For example, if fewer PRBs are allocated in a retransmission, the $N_{RE}$ is then decreased accordingly. To keep the TB size $N_{info}$ unchanged, the MCS has to be increased to fetch larger $R*Q_m$ from the 5.1.3.1-2 table of 3GPP 38.213. However, as mentioned before, the table 5.1.3.1-2 has only 32 discrete quantized RE efficiency rows/levels, which is relatively difficult to find the appropriate $R*Q_m$ to generate exactly the same $N_{info}$ as the one in a new transmission.

SUMMARY

Although SGNR supports CBG-based retransmissions, the following defects exist:

The maximum CBG number is too small

The existing 5GNR solution only supports up to 8 CBGs due to the CBGTI field limit (8 bits). Considering that one TB can contain up to hundreds of CBs, even if the maximum of 8 CBGs are configured, then one CBG may contain up to 12.5 CBs. Once one CB fails in the decoding, its corresponding CBG, including all the 12.5 CBs, has to be retransmitted. In other words, the existing solution still suffers from the same low efficiency retransmission issue as LTE. To resolve the HARQ efficiency issue, an ideal solution is expected to support more CBGs. In the extreme case, the CBG number can approach the maximum CB number within one TB, i.e. one CBG includes one CB. As such, the retransmission becomes CB-based, and there is no need to transmit any other positively acknowledged CBs during a retransmission.

Difficulty to Keep the Same TB Size in Retransmissions

Once the UE misses the original DCI in a new transmission, the UE has no idea of the original TB size, which will cause decoding failure even if the UE has received all the Redundancy Versions (RV) 1-3 from the retransmission. To recover the PDSCH decoding from the initial missed DCI, the MCS in the retransmitted DCI would need to indicate the exact same TB size as the new transmission.

However, the 32 discrete RE efficiency granularities indicated by the 5-bit MCS as well as the 5GNR TBS formula make it difficult to find the exact same TB size in the retransmission.

It has been observed that the existing 5G TBS determination formula has even lower probability than LTE to find the same TB size in a retransmission as a new transmission, once the PRB allocation is changed. In order to keep the same TB size, the TB size determination procedure needs to be more flexible with more adjustable parameters to compensate the PRB allocation change in retransmissions.

PDCCH Blind Detection Limits DCI Extension

With more scenarios introduced in 5GNR, 5GNR needs to add more information into the scheduling instruction for the UE to support more new functionalities. However, although the fields in the existing DCI supports variable sizes according to different configurations, the DCI size still needs to be kept the same (e.g. fixed) once the Radio Resource Control (RRC) configuration is decided at a given time, since the 5GNR still uses the PDCCH blind detection mechanism like in LTE. This limits to at most 4 different DCI sizes in one scheduling slot to avoid UE overloading.

Such a constrain blocks the introduction of new fields into the DCI in the future, since the introduction of new fields will cause the UE to have to be able to blindly detect more than 4 DCI sizes when coexisting with the legacy DCI structure.

To resolve the problem, 5GNR needs a flexible and efficient method to carry more control data at the Transmission Time Interval (TTI) level without breaking the PDCCH blind detection limit.

Embodiments of the present disclosure allow to mitigate the above drawbacks.

According to a first aspect, some embodiments include a method performed by a wireless device for handling data in a communication network. The method generally comprises: receiving a downlink signal, wherein the downlink signal comprises a Physical Downlink Control Channel (PDCCH) and a Physical downlink Shared Channel (PDSCH), the PDCCH having first downlink Control Information (DCI) indicating at least second downlink control information (DCI) in the PDSCH; and performing one of encoding and decoding user data in the PDSCH based on the first DCI and second DCI.

In some embodiments, the method may comprise decoding the second DCI based on the first DCI.

In some embodiments, the second DCI may span a number of REs in the PDSCH from a first RE in a frequency direction first and then in a time direction until the number of REs is reached.

In some embodiments, the second DCI can be used only for a retransmission of user data.

In some embodiments, the size of the second DCI may depend on a redundancy version for a retransmission.

In some embodiments, the second DCI may comprise: a first field for indicating if a same modulation is used for the second DCI and user data in the PDSCH; a second field for indicating a Code Block Group bitmap for retransmission; an optional third field for indicating a row index of a two-dimensional Transport Block Size (TBS) table; an optional fourth field for indicating a difference between a column index of the two-dimensional TBS table and a nominal PRB number.

For example, the third and fourth fields of the second DCI can be used to determine a size of a Transport Block (TB) of an original transmission.

In some embodiments, the second DCI may comprise: a first field for indicating if a same modulation is used for the second DCI and user data in the PDSCH; a second field for indicating a Code Block Group bitmap for retransmission; an optional third field for indicating a TBS of an original transmission using a one-dimensional TBS table.

In some embodiments, the CBG bitmap can be given by an CBG indicator in the first DCI and the second field in the second DCI.

According to a second aspect, some embodiments include a wireless device configured, or operable, to perform one or more functionalities (e.g. actions, operations, steps, etc.) of the wireless device as described herein.

In some embodiments the wireless device may comprise one or more communication interfaces configured to communicate with one or more other radio nodes and/or with one or more network nodes, and processing circuitry operatively connected to the communication interface, the processing circuitry being configured to perform one or more functionalities of the wireless device as described herein. In some embodiments, the processing circuitry may comprise at least one processor and at least one memory storing instructions which, upon being executed by the processor, configure the at least one processor to perform one or more functionalities of the wireless device as described herein.

In some embodiments, the wireless device may comprise one or more functional modules configured to perform one or more functionalities of the wireless device as described herein.

According to a third aspect, some embodiments include a non-transitory computer-readable medium storing a computer program product comprising instructions which, upon being executed by processing circuitry (e.g., at least one processor) of the wireless device, configure the processing circuitry to perform one or more functionalities of the wireless device as described herein.

According to a fourth aspect, some embodiments include a method performed by a network node for transmitting an extended DCI (second DCI) to a wireless device, in a communication network. The method generally comprises: determining one or more parameters for second downlink control information (DCI); indicating the one or more parameters of the second DCI in a first DCI; and sending a downlink signal to a wireless device, wherein the downlink signal comprises a Physical Downlink Control Channel (PDCCH) and a Physical downlink Shared Channel (PDSCH), the PDCCH carrying the first DCI and the PDSCH carrying the second DCI.

In some embodiments, the second DCI may span a number of REs in the PDSCH from a first RE in a frequency direction first and then in a time direction until the number of REs is reached.

In some embodiments, the size of the second DCI may depend on a redundancy version for a retransmission.

In some embodiments, the second DCI may comprise: a first field for indicating if a same modulation is used for the second DCI and user data in the PDSCH; a second field for indicating a Code Block Group bitmap for retransmission; an optional third field for indicating a row index of a Transport Block Size (TBS) table; an optional fourth field for indicating a difference between a column index of the TBS table and a nominal PRB number. For example, the third and fourth fields of the second DCI can be used to determine a size of a Transport Block (TB) of an original transmission.

In some embodiments, the second DCI may comprise: a first field for indicating if a same modulation is used for the second DCI and user data in the PDSCH; a second field for indicating a Code Block Group bitmap for retransmission; an optional third field for indicating a TBS of an original transmission using a one-dimensional TBS table.

According to a fifth aspect, some embodiments include a network node configured, or operable, to perform one or more functionalities (e.g. actions, operations, steps, etc.) of the network node as described herein.

In some embodiments, the network node may comprise one or more communication interfaces configured to communicate with one or more other radio nodes and/or with one or more network nodes, and processing circuitry operatively connected to the communication interface, the processing circuitry being configured to perform one or more functionalities of the network node as described herein. In some embodiments, the processing circuitry may comprise at least one processor and at least one memory storing instructions which, upon being executed by the processor, configure the at least one processor to perform one or more functionalities of the network node as described herein.

In some embodiments, the network node may comprise one or more functional modules configured to perform one or more functionalities of the network node as described herein.

According to a sixth aspect, some embodiments include a non-transitory computer-readable medium storing a computer program product comprising instructions which, upon being executed by processing circuitry (e.g., at least one processor) of the network node, configure the processing circuitry to perform one or more functionalities of the network node as described herein.

The advantages/technical benefits of the embodiments of the present disclosure are as follows:

—Larger Capacity

Compared with PDCCH, PDSCH has more RE resources so that the extended DCI has larger space to accommodate more control information than the basic DCI.

—Lower Decoding Effort

Unlike the existing basic DCI which needs multiple blind detection attempts based on the Control Channel Element (CCE) candidate calculation rule, the extended DCI can be deterministically decoded according to the MCS field (3 bits for the extended DCI RE number and 2 bits for the extended DCI modulation) and Redundancy Version. As such, the UE's effort in decoding is decreased, and the DCI decoding success rate is increased.

—Higher Flexibility

Moreover, the extended DCI adopts an independent modulation and coding scheme from the PDSCH data, which allows the gNB to utilize a more robust link adaptation algorithm to guarantee the successful decoding of the extended DCI.

—Backward Compatibility

The extended DCI keeps the existing 5G DCI's size and most fields unchanged, i.e. the UE's PDCCH blind detection won't be impacted, which guarantees the backward compatibility with the existing 5GNR system. As such, the new solution can achieve all the above benefits without changing the 3GPP standard. Indeed, the extended DCI mechanism can be implemented in a specific UE vendor, which can benefit the specific UE with higher efficiency in CB retransmissions, smaller TBS quantization errors and shorter CB processing delays.

This summary is not an extensive overview of all contemplated embodiments and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which.

DETAILED DESCRIPTION

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

As mentioned above, in order to support more CBGs within one TB or to have a flexible TBS determination, additional control data are needed during each scheduling. However, the additional control data can't be directly added into the existing DCI, due to the PDCCH blind detection limit. Generally stated, embodiments of the present disclosure provide for an efficient DCI extension, which can carry any new control data without increasing the PDCCH blind detection overhead. For example, the extended DCI is carried in the PDSCH.

Extended DCI I in PDSCH

Figure 1:
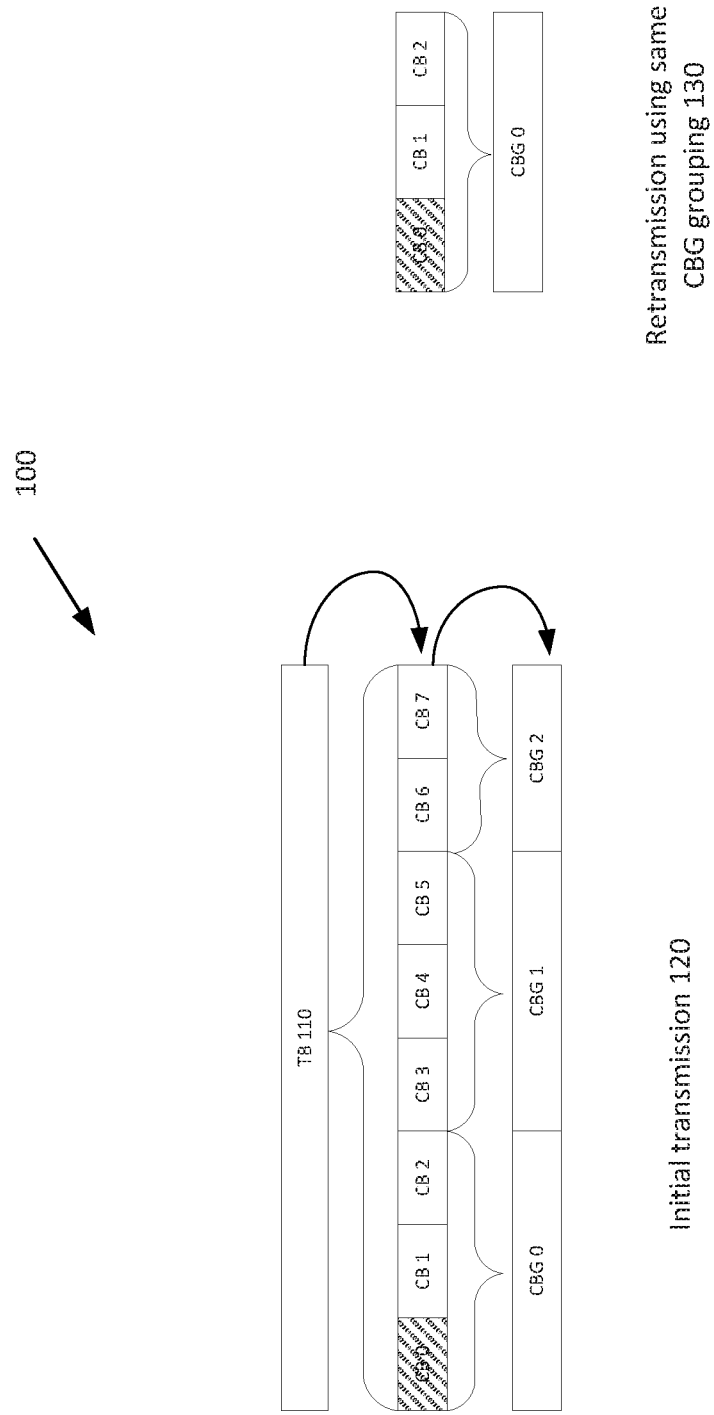
FIG. 1 illustrates a CBG-based HARQ mechanism.
Figure 2:
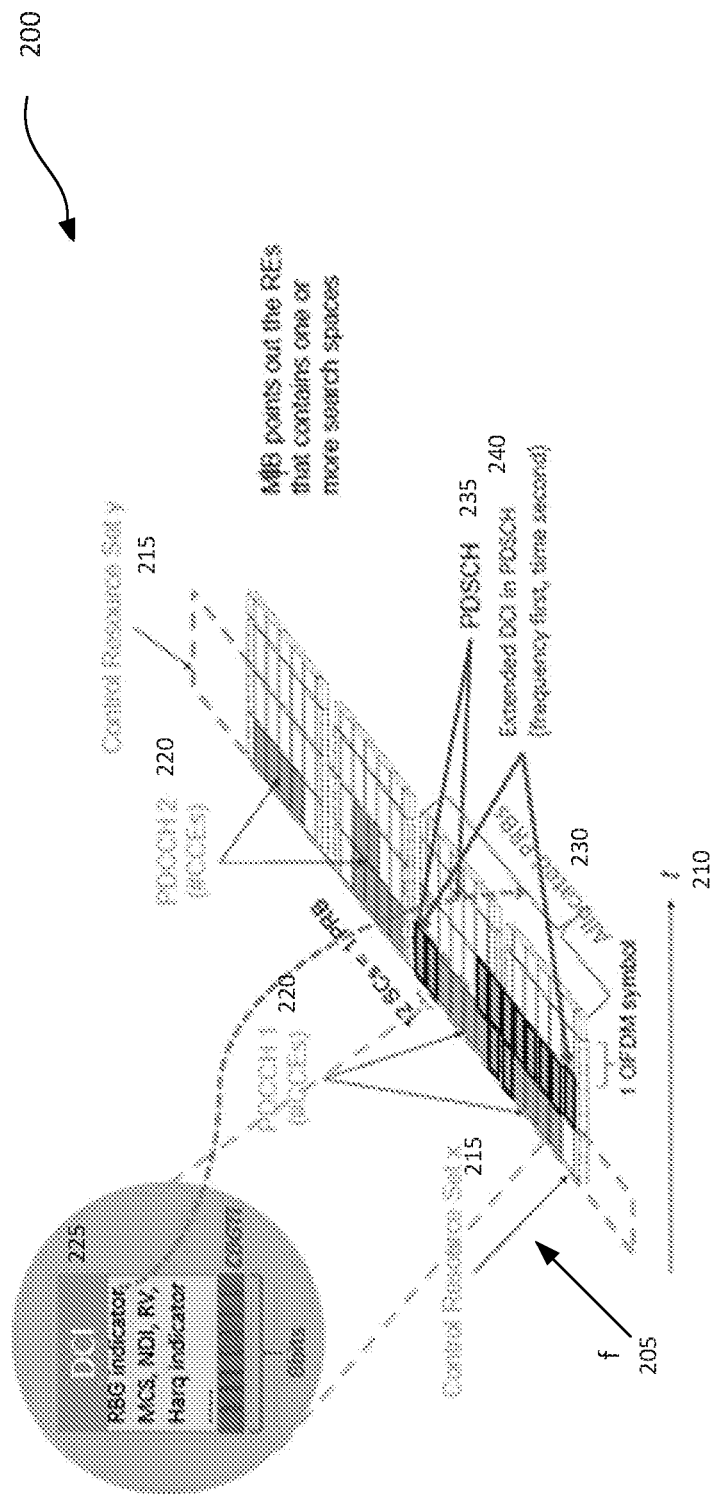
FIG. 2 is a schematic diagram of a resource grid according to an embodiment of the present invention.

FIG. 2 shows a resource grid 200, according to an embodiment. The resource grid 200 spans over the frequency and time dimensions. For example, the resource grid shows different sub-carriers in the frequency dimension (or axis) 205 and different Orthogonal Frequency Division Multiplex (OFDM) symbols in the time dimension (or axis) 210. For example, 12 sub-carriers is equal to 1 PRB. The resource grid 200 further comprises different control resource sets 215 (e.g. Control Resource sets x and y), carried by different PDDCHs 220, for example. The control resource sets 215 may comprise different control information, such as the basic DCI 225. The DCI 225 may comprise different fields, such as Resource Block Group (RBG) indicator, MCS, New Data Indicator (NDI), RV, HARQ indicator, CBGTI, etc. The DCI 225 uses the RBG indicator to indicate the allocated PRBs 230 for the PDSCH 235, where some REs (darker area) are reserved for the extended DCI 240 followed by the normal user data, if the UE is configured to enable the DCI extension. The extended DCI area always expands from the starting REs of the PDSCH 235 in direction of the frequency 205 first and then in the time direction 210 until the configured number of REs for the extended DCI is reached so that the UE can quickly decode the extended DCI 240 without having to receive all the OFDM symbols.

Unlike the basic DCI 225 in PDCCH, which relies on the UE's best-effort blind detection, the extended DCI 240 in PDSCH 235 can be deterministically decoded according to the indication of the basic DCI 225, i.e. once the basic DCI 225 is successfully decoded by the UE, the extended DCI 240 is then decoded just like the normal PDSCH user data.

Extended DCI's Occasion

The extended DCI 240 can include additional control information for enhanced functionalities, such as an extended CBG bitmap, which together with the CBGTI field in the basic DCI 225 can support more than 8 CBGs within one TB. However, unlike the basic DCI 225, which is mandatory for TTI scheduling, the extended DCI 240 doesn't always exist in each PDSCH 235. Instead, it has the following two occasions.

1) The Extended DCI Only Exists in Retransmissions:

Since the extended DCI 240 usually includes the additional information for the enhanced functionalities, such as offering a bitmap of more than 8 CBGs and an enhanced TBS determination, which are only applicable to retransmissions, the extended DCI 240 doesn't exist in a new transmission (which always includes all CBGs). Taking the default 10% PDSCH Block Error Rate (BLER) as an example, the extended DCI 240 is absent in 90% of the cases, which greatly decreases the resource consumption of the PDSCH and the UE's decoding effort.

2) The Extended DCI Size Varies According to Redundancy Version (RV):

Even in retransmissions, the extended DCI 240 content may vary for different RVs according to the gNB's configuration, since some content (such as prbOffset and TBSI as will be described later) in the extended DCI 240 is used to decide the original TB size (TBS), which is not always needed in each RV.

In the typical RV round 0-2-3-1, RV0 includes all the systematic bits, but RV1 and RV2 include fewer systematic bits, which means that once RV0 is missing, most systematic bits are also lost. Then, the UE will have relatively low probability to successfully decode the PDSCH 235 due to a lack of systematic bits in RV1 and RV2, even if the UE knows the original TB size. In other words, it's unnecessary to include TBS related information in the extended DCI 240 during a RV1 or RV2 retransmission. Alternatively, RV3 may contain most of all the systematic bits so that the extended DCI 240 in RV3 need to include TBS related information for the UE to determine the original TB size. Based on such information, the UE then has high probability to decode the PDSCH 235 even if RV0 is missing.

Decoding of the Extended DCI

Although occupying the starting REs of the PDSCH 235, the extended DCI 240 adopts an independent modulation and coding scheme from the following user data so that the UE needs to know the parameters to decode the extended DCI 240. Based on those parameters, the UE can proceed to decode the user data in PDSCH.

1) Extended DCI Size

As mentioned earlier, the extended DCI size varies according to different configurations, such as the maximum CBG number, affinity relationship with RV, etc. Generally speaking, the extended DCI 240 includes the following information:

A) a mandatory part that comprises fields which are always available in each extended DCI, such as pdschReMod.

B) an optional part that comprises fields not always available in each extended DCI, such as prbOffset.

More specifically, the mandatory part of the extended DCI 240 comprises the following fields:

pdschReMod (1 bit) indicates if the same modulation is used for both PDSCH and extended DCI; and CBGRI (Code Block Group Remaining Information, which is configured via the RRC configuration) indicates the retransmission CBG bitmap together with CBGTI (of the basic DCI 225).

The optional part of the extended DCI 240 comprises the following fields:

Transmission Block Size Index (TBSI) (5 bits, optional) indicates the row index of PDSCH in a 2-dimensional TBS table (see table 2 below).

prbOffset (4 bits, optional) indicates the difference between the TBS column index and a nominal PRB number.

The TBSI and prbOffset fields, which are used to calculate the original TB size, are optional according to the configuration of affinity relationship with RV (see table 1). The pdschReMod and CBGRI fields are mandatory for the extended DCI 240 and in each RV retransmission.

Table 1 shows an example of affinity relationship of the extended DCI:

| Optional fields | RV1 | RV2 | RV3 |
|---|---|---|---|
| TBSI and prbOffset | 0 | 0 | 1 |

Once a configuration is selected, the extended DCI size can be determined accurately in each transmission with a specific RV.

For instance, taking table 1 as an example and assuming that the gNB configures a maximum of 16 CBGs within one TB, the extended DCI size is determined as follows:

In RV 1 and 2, the extended DCI 240 has 9 bits (1-bit pdschReMod+8-bit CBGRI).

In RV 3, the extended DCI has 18 bits (1-bit pdschReMod+8-bit CBGRI+5-bit TBSI+4-bit prbOffset).

TABLE 2

| | TBS table with nominal number of PRBs (nrofNominalRb) | | | |
|---|---|---|---|---|
| TBS Index | 1 nrofNominalRb ($N_{PRB}^{norm}$) | 2 nrofNominalRbs ($N_{PRB}^{norm}$) | ... | 100 nrofNominalRbs ($N_{PRB}^{norm}$) |
| 0 | $TBS_{0,1}$ | $TBS_{0,2}$ | ... | $TBS_{0,100}$ |
| 1 | $TBS_{1,1}$ | $TBS_{1,2}$ | ... | $TBS_{1,100}$ |
| ... | ... | ... | ... | ... |
| 27 | $TBS_{28,1}$ | $TBS_{28,2}$ | ... | $TBS_{28,100}$ |
| 28 | QPSK | QPSK | ... | QPSK |
| 29 | 16QAM | 16QAM | ... | 16QAM |
| 30 | 64QAM | 64QAM | ... | 64QAM |
| 31 | 256QAM | 256QAM | ... | 256QAM |

In another embodiment, a one-dimensional TBS table can be created. This table, referred to as table 3 contains all the unique TBS values of Table 2. The table 3 comprises an Identity/Index for Transport Block Size (TBS_ID) and its corresponding TBS value.

TABLE 3

| one dimensional TBS table | | | | | |
|---|---|---|---|---|---|
| TBS_ID | 0 | 1 | ... | ... | N-1 |
| TBS Value | $TBS_0$ | $TBS_1$ | ... | ... | $TBS_{N-1}$ |

The optional fields of the extended DCI 240, such as parameters TBSI and prbOffset, can be replaced by TBS_ID, which is 8 to 9 bits. Its corresponding TBS value can be used to represent the original TB size in a retransmission with RV 1.

In this case, the extended DCI 240 in RV 3 would be 17 or 18 bits (1-bit pdschReMod+8-bit CBGRI+8 or 9 bits TBS_ID) depending on how many unique TBS values there are in Table 2.

2) RE Number for the Extended DCI

Although the extended DCI 240 always occupies the starting REs of the PDSCH 235, the UE still needs to know how many REs are reserved for the extended DCI 240. This can be done by reusing the 5-bit MCS field in the basic DCI 225, for example.

More specifically, the MCS field (5 bits) of the basic DCI 225, which is normally used to indicate the RE efficiency index (referring to a table row index), can be reused to indicate the extended DCI's RE number and modulation (when the DCI extension is enabled for the UE).

Figure 3:
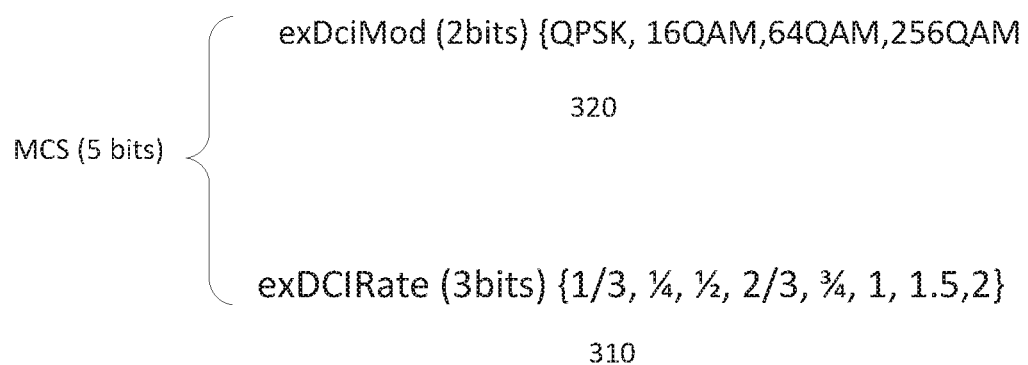
FIG. 3 illustrates a 5-bit MCS field in the basic DCI.

As shown in FIG. 3, among the 5 bits of the MCS field, 3 bits 310 can be used to indicate the ratio of the extended DCI's RE number over the effective PDSCH RE number within the allocated PRBs per OFDM symbol. The indicated ratio allows the UE to determine the number of REs used for the extended DCI 240. From the starting position of PDSCH, the extended DCI's RE expands along the frequency domain/direction first and then towards the time domain/direction until the determined RE number is reached.

3) Modulation of the Extended DCI

The remaining 2 bits 320 of the MCS field can be used to indicate the extended DCI's modulation (e.g. QPSK, 16QAM, 64QAM and 256QAM). As for the modulation of the PDSCH data, it can be given by the field "pdschReMod" in the extended DCI 240, as described later.

Unlike the basic DCI 225, which has a strict size limit due to PDCCH, the extended DCI 240 located in the PDSCH 235 is insensitive to size limit so that it can have flexibility to carry more control information (CBGRI, prbOffset, etc.) to support the enhanced functionalities, such as more than 8 CBGs per TB, enhanced TB size determination method, etc.

Extended DCI Application in SGNR CB Transmission

1) Support More CBGs within One TB

The existing DCI 225 has a field denoted CBGTI (8 bits) for indicating which CBGs are included in the current transmission: "1" means the corresponding CBG is included, otherwise "0" is used. As mentioned earlier, to avoid unnecessary CB retransmissions, the 8-bit CBGTI needs to be extended to include more bits. However, due to the DCI size limit, the CBGTI field in the basic DCI 225 cannot be extended.

Figure 4:
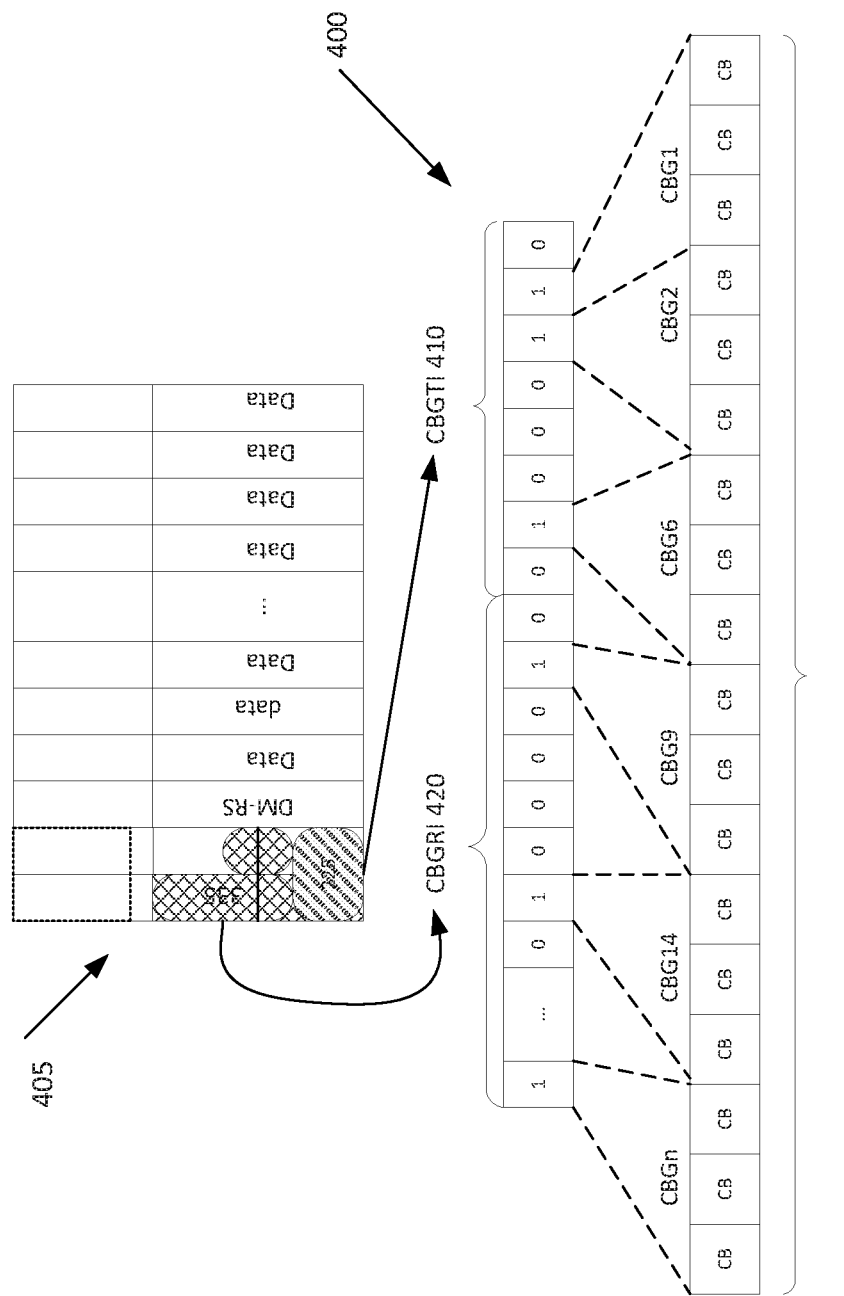
FIG. 4 illustrates an example of an extended bitmap, provided in a resource grid, according to an embodiment.

The new CBGRI field in the extended DCI 240 together with the existing CBGTI field in the basic DCI 225 allow to construct a larger bitmap to indicate more CBGs in the context of retransmissions, as shown in FIG. 4. FIG. 4 illustrates an example of an extended bitmap 400, provided in a resource grid 405, for example. The resource grid may comprise a basic DCI 225, signaled in the PDDCH and an extended DCI 240, using the PDSCH resources. The PDSCH resources are also used to carry DM-RS and user data, for example.

Once the UE has decoded the basic DCI 225, it obtains the CBGTI 410. It can also decode the extended DCI 240, from which it can obtain the CBGRI 420. CBGRI 420 together with CBGTI 410 provides the extended bitmap 400. As an example, the extended bitmap 400 shows that CBG1, CBG2, CBG6, CBG9, CBG14 and CBGn are present in the TB for retransmission, with each CBG having 3CBs.

Since in PDSCH there is no blind detection, the extended DCI 240 provides a larger capacity to accommodate additional control information. As such, the CBGRI field, whose size is variable and configured by the RRC configuration for the maximum CBG number, can contain many more bits than the fixed sized CBGTI field. As an example, the configured CBG number can reach the maximum CB number within one TB so as to implement a CB-based retransmission, which can avoid unnecessary CB retransmissions.

2) A New TB Size Determination Method

Figure 5:
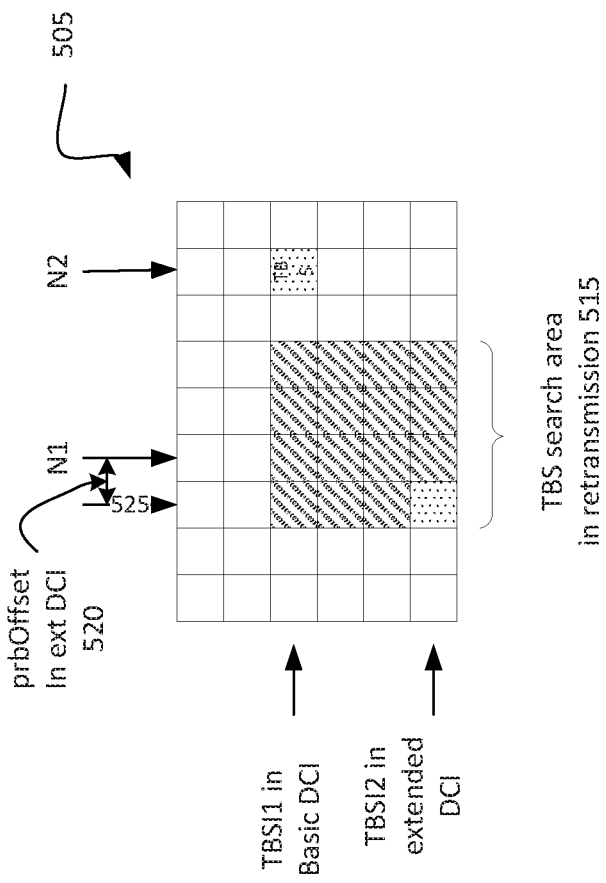
FIG. 5 illustrates a first grid and a second grid corresponding to a two-dimensional TBS table, in accordance with some embodiments.
Figure 5:
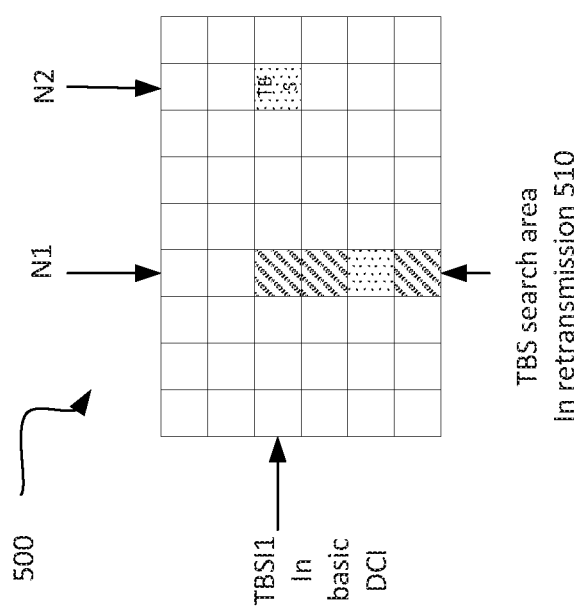

The embodiments of the present disclosure introduce a new and adjustable parameter referred to as prbOffset, which allows to expand the TBS searching area in retransmissions, as can be shown in FIG. 5. FIG. 5 illustrates a first grid 500, that represents a TBS table (such as the two-dimensional TBS table 2), for TBS searching possibilities. FIG. 5 also illustrates a second grid 505 that also represents the TBS table for TBS searching possibilities based on the teachings of the present disclosure. For example, the new parameter prbOffset can expand the TBS searching area from a single column (e.g. column 510) as in the application PCT/IB2018/054337, entitled "Method and node for decoding or encoding user data based on TBS index" to an area (hashed area) with multiple columns (e.g. area 515). As an example, the area 515 comprises 4 columns as illustrated in FIG. 5.

In the first grid 500, a TBSI (TBSI1) is provided by the basic DCI 225, which represents the row index of the grid 500. This TBSI1 is the TBSI signaled for a new transmission. N1 corresponds to the number of allocated PRBs (or nominal PRB number) in the retransmission, whereas N2 corresponds to the number of allocated PRBs in the new transmission. N1 and N2 represent a column index of the grid/table 500. Using the TBS determination method in the application PCT/IB2018/054337, the search for the TBS is within the column indicated by N1, for example. In the grid 505, the prbOffset 520 can be used to expand the TBS search area. For example, if a 4-bit prbOffset is considered, the searching area 515 can be expanded to 16 times (e.g. $2^4$) of that in the grid 500.

Since the searching area is expanded to 16 columns, as an example, the probability of finding the exact same TB size in a retransmission as in a new transmission is increased, even if the PRB allocation in the retransmission has been changed.

In another embodiment, TBS_ID (replacing TBSI and prbOffset) can be used, and its corresponding TBS value (see table 3) can be used to determine the original TB size in a retransmission.

Once the same TBS is found, the difference between the corresponding column (e.g. column 525) and the nominal PRB number (N1) in the retransmission is set to prbOffset 520 in the extended DCI 240 and its corresponding row index is set to the TBSI field of the extended DCI 240 (referred to as TBSI2 in FIG. 5). At the receiving side, the UE decodes the extended DCI 240, from which it can get the prbOffset and TBSI parameters. The prbOffset parameter is then added to the nominal PRB number as the column index and TBSI as the row index, in order to fetch the value from the TBS table (see Table 2) as the original TB size. The determined TBS value will be used in subsequent PDSCH decoding.

By using the adjustable parameter (prbOffset) into the table-based TBS determination, the present embodiments not only support a nonlinear TBS determination, but also provide high probabilities to find the exact same TB size in a retransmission as in the new transmission.

Figure 6:
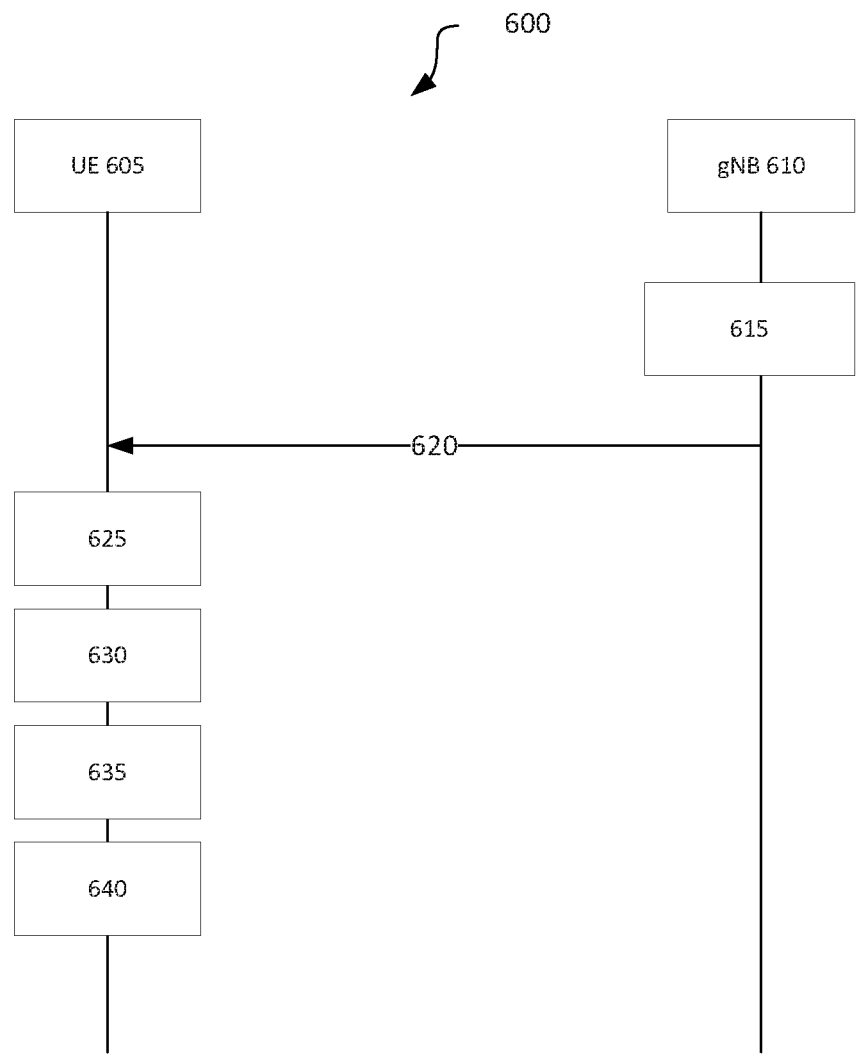
FIG. 6 is a signal diagram of a method 600 for transmitting data between a UE 605 and a base station or gNB 610, in accordance with some embodiments.

Now, an implementation example of the embodiments will be described with reference to FIG. 6. FIG. 6 illustrates a signal diagram of a method 600 for transmitting data between a UE 605 and a base station or gNB 610.

Step 615: Enable DCI Extension

The extended DCI can be implemented as an enhanced feature. For example, the DCI extension is by default disabled in the UE 605. After determining that the UE 605 supports this feature, by checking the UE's capabilities for example, the gNB 610 can enable the DCI extension with the configuration of affinity relationship between the extended DCI 240 and a redundancy version, given by Table 1, for example.

In another embodiment, the gNB 610 can enable the DCI extension with the configuration of affinity relationship between the extended DCI 240 and a redundancy version as given by table 4. Indeed, table 4 shows an alternative example of affinity relationship of the extended DCI:

Table 4 shows an alternative example of affinity relationship of the extended DCI:

| Optional fields | RV1 | RV2 | RV3 |
|---|---|---|---|
| TBS_ID | 0 | 0 | 1 |

As mentioned earlier, the extended DCI size varies according to the configuration, based on the different RVs (see Tables 1 and 4). The gNB 610 can implement Table 1 or 4 freely. For example, a typical configuration may be that only RV3 has TBSI and prbOffset fields (or TBS_ID field) in the extended DCI 240, but RV1 and RV2 do not have those fields configured. This configuration can further decrease the extended DCI resource consumption. Taking a 10% BLER as example, in 90% of the cases, there is no extended DCI at all (new transmissions), in 6.67% of the cases, the extended DCI has only 9 bits (RV1 and RV2 retransmissions), in 3.33% of the cases, the extended DCI 240 has 18 bits (RV3 retransmission).

The DCI extension doesn't impact UE's blind detection. The 5-bit MCS field in the basic DCI format 1-1 is split into two parts as shown in FIG. 3, once the DCI extension feature is enabled.

To lower down the interference between different layers, the extended DCI 240 doesn't support Multiple Input Multiple Output (MIMO), i.e. the multiple layers of the user data can only be mapped to the subsequent PDSCH REs following the extended DCI 240. Accordingly, only the MCS field in the $1^{st}$ codeword is reused for the extended DCI, the other MCS field in the $2^{nd}$ codeword remains unchanged to indicate the TBS in the 2nd codeword.

During the DCI extension enabling period, to avoid ambiguity of the MCS field, the DCI format 1-0 can be used to grant DownLink (DL) scheduling. After the RRC complete message is received from the UE, the gNB can shift to the DCI format 1-1 for DL scheduling, in which the 5-bit MCS field is then reused for indicating information about the extended DCI unambiguously.

Step 620: Receiving by the UE the DCI in the PDCCH

The gNB 610 sends downlink data to the UE 605, for example. The downlink data comprise a PDCCH comprising DCI (basic DCI 225) and PDSCH data. Upon receipt of the PDCCH, the UE decodes the DCI 225, for example.

Step 625: Determine the Extended DCI Size

As mentioned earlier, based on the configuration provided by Table 1 or 4, the UE can determine the size of the extended DCI. Taking the configuration of Table 1 or 4 and assuming that the gNB configures a maximum of 16 CBGs within one TB, the extended DCI size is determined as follows:

In RV 1 and 2, the extended DCI has 9 bits (1-bit pdschReMod+8-bit CBGRI);

In RV 3, the extended DCI has 18 bits (1-bit pdschReMod+8-bit CBGRI+5-bit TBSI+4-bit prbOffset).

Alternatively, in RV3, the extended DCI can have 17 or 18 bits (1-bit pdschReMod+8-bit CBGRI+17 or 18-bit TBS_ID).

Step 630: Calculate the RE number of the extended DCI

The RE number of the extended DCI ($N_{RE}^{exDCI}$) can be calculated according to the following formula:

$$N_{RE}^{exDCI} = \lceil N_{PRB}^{DL} \times R_{exDCIrate}^{RE} \rceil \times N_{symbol}^{RE} \quad \text{formula (2)}$$

Where $N_{PRB}^{DL}$ refers to the allocated PRB number as indicated by the RBGfield in the basic DCI 225; $N_{symbol}^{RE}$ refers to the effective RE number per OFDM symbol within the allocated PRBs and $R_{exDCIrate}^{RE}$ refers to the 3-bit extended DCI resource ratio. As a note, $R_{exDCIrate}^{RE}$ is the same as exDCIrate, as illustrated in FIG. 3.

For example, if 10 PRBs are allocated for a UE and 8 REs for the PDSCH data per PRB per symbol (the remaining 4 REs are for DMRS), if $R_{exDCIrate}^{RE}=1/8$, then the first 16 ($\lceil 10/8 \rceil \times 8$) effective REs excluding DMRS are reserved for the extended DCI 240, immediately followed by the REs for the PDSCH data.

In another embodiment, the RE number of the extended DCI ($N_{RE}^{exDCI}$) can be calculated according to the number of REs per nominal PRBs, $N_{RE}^{PRB}$:

$N_{RE}^{exDCI} = N_{RE}^{PRB} \times R_{exDCIrate}^{RE}$. If $N_{RE}^{PRB}=128$ and $R_{exDCIrate}^{RE}=1/8$, then $N_{RE}^{exDCI}=128 \times 1/8=16$.

Step 635: Decode the Extended DCI

After determining the extended DCI size, the occupied RE number and the modulation (given by the 2 bits of the MCS field in the basic DCI 225), the UE 605 can calculate the code rate R according to the following formula:

$$R = \frac{Size_{exDCI}}{N_{exDCI}^{RE} \times M_{exDCI}} \quad \text{formula (3)}$$

Where $Size_{exDCI}$ is the size of the extended DCI, $N_{exDCI}^{RE}$ is the number of occupied REs for the extended DCI and $M_{exDCI}$ is the modulation of the extended DCI.

Using all the determined parameters, the UE 605 can decode the extended DCI 240 accordingly, e.g. in the same manner as for PDSCH user data.

Since the extended DCI 240 uses independent code rate and modulation, it allows the gNB 610 to adopt different link adaptation algorithms for the extended DCI 240 to meet the lower BLER goal for the extended DCI 240 than for PDSCH user data.

Step 640: Decode or Encode PDSCH User Data

The UE 605 can then decode or encode the PDSCH user data, based on the basic DCI 225 and extended DCI 240, using the following parameters, TBS, number of actual REs assigned, modulation order, code rate, etc.

Figure 7:
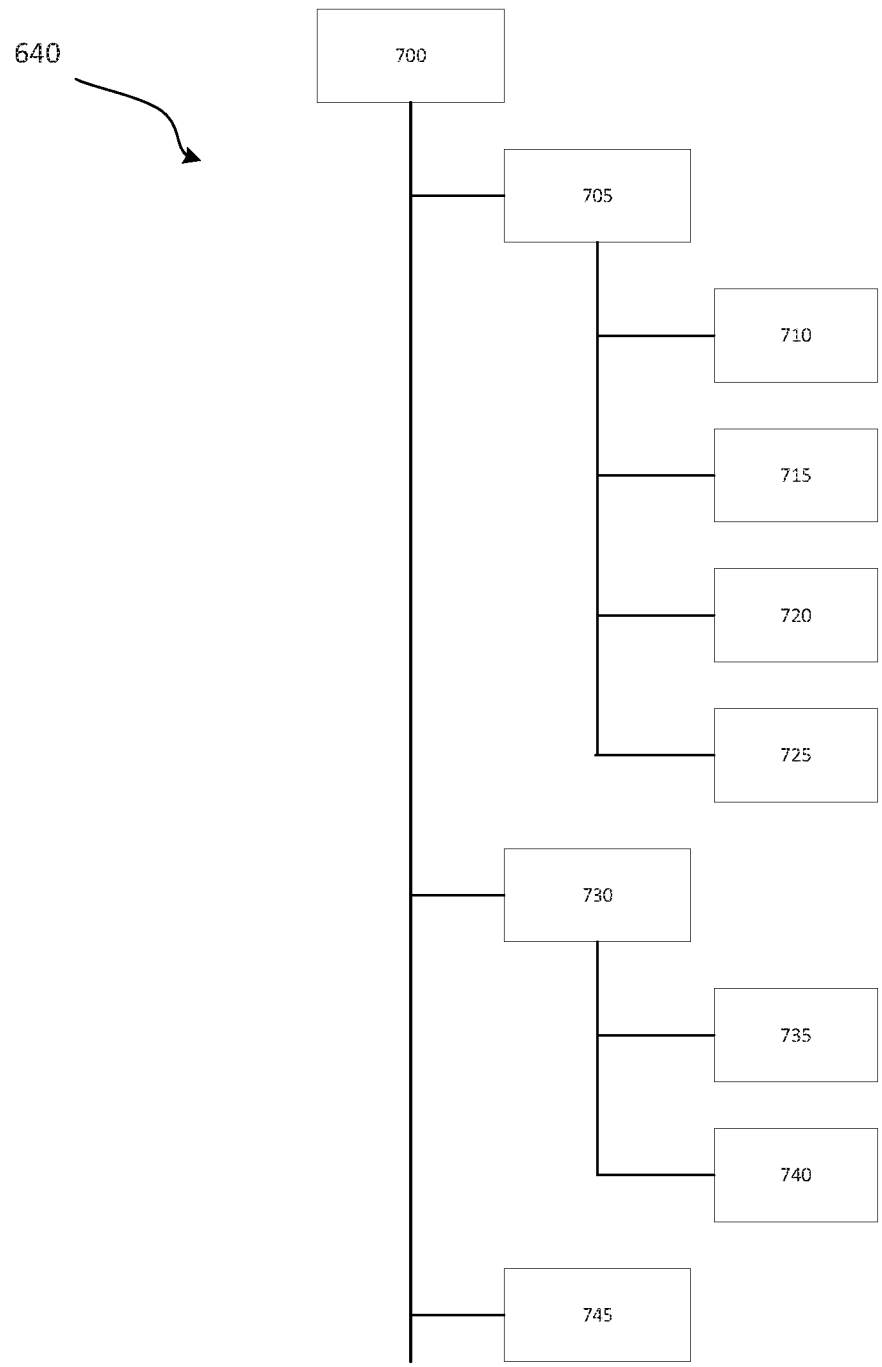
FIG. 7 is a schematic diagram illustrating different steps for decoding or encoding PDSCH user data, in accordance with some embodiments.

FIG. 7 illustrates different steps within step 640. For example, step 640 comprises:

Step 700: Determine the Actual PDSCH Payload Size in Retransmission (where the PDSCH Payload Contains the Re-Transmitted CBs)

Step 705: Determine the TBS

If the extended DCI in the current RV includes the prbOffset and TBSI fields according to the configuration in Table 1, the UE can determine the original TBS according to the following steps:

Step 710: Calculate the total effective RE number $N_{RE}$ based on the PRB allocation indication in the basic DCI 225;

Step 715: Determine the number of nominal PRBs $N_{PRB}^{norm}$ based on $N_{RE}$ calculated in step 710 and a configured parameter $N_{RE}^{PRB}$ (RE number per nominal RB) using the following formula:

$$N_{PRB}^{norm} = \left\lceil \frac{N_{RE}}{N_{RE}^{PRB}} \right\rceil \quad \text{formula (4)}$$

Step 720: Calculate the TBS table column index by adding the nominal PRB number calculated in step 715 to prbOffset in the extended DCI.

Step 725: Use the 5-bit TBSI in the extended DCI as the row index and the column index calculated in step 720 to look up the TBS table 2 to determine the TB size.

Alternatively, the TBS value can be derived using TBS_ID according to Table 3.

Step 730: Determine the Actual Payload Size in Retransmission Based on the CBG Bitmap Although the original TB size is determined, the actual payload size in a retransmission needs to be recalculated based on the CBG bitmap, since each retransmission may include different CBGs, once CBG-based HARQ is enabled in 5G. The UE determines the actual payload size as follows:

Step 735: Combine CBGRI in the extended DCI 240 together with the CBGTI in the basic DCI 225 into a complete CBG bitmap, in which "1" bit means the corresponding CBG is included in the current retransmission; otherwise (or "0") it means that the corresponding CBG is not included in the current retransmission.

Step 740: Calculate the actual payload according to the following formula:

$$Size_{payload}^{retran} = \Sigma_0^{maxCBG-1} \begin{cases} Size_i^{CBG}, & i^{th} \text{ bit in } CBG \text{ bitmap} = 1 \\ 0, & \text{otherwise} \end{cases} \quad \text{formula (5)}$$

Where $Size_i^{CBG}$ refers to the size of $CBG_i$ which is determined according to the original TB size and configured with a maximum CBG number according to the formula:

$$N^{CB} = \left\lceil \frac{TBS}{MaxCBSize} \right\rceil$$

$$Size^{CB} = \frac{TBS}{N^{CB}}$$

$$N_{CBG_i}^{CB} = \begin{cases} \left\lceil \frac{N^{CB}}{N_{max}^{CBG}} \right\rceil, & 0 \le i < N^{CB} \bmod N_{max}^{CBG} \\ \left\lfloor \frac{N^{CB}}{N_{max}^{CBG}} \right\rfloor, & \text{otherwise} \end{cases}$$

$$Size_i^{CBG} = N_{CBG_i}^{CB} \times Size^{CB}$$

Where $N^{CB}$ is the number of CBs, MaxCBSize is the maximum size of a CB, $N_{CBG_i}^{CB}$ is the number of CBs in a CBG i, $Size^{CB}$ is the size of all the CBs, and $N_{max}^{CBG}$ is the maximum number of CBGs.

Once the actual payload size is determined, the code rate and modulation of the payload (in PDSCH) can be determined as well, as shown below.

Step 745: Determine PDSCH Code Rate and Modulation in Retransmission

According to the pdschReMod field in the extended DCI 240, the PDSCH modulation is determined as follows:

When pdschReMod=0:

The PDSCH modulation is determined based on the actual payload size in the retransmission (calculated in steps 705-740) according to the modulation derivation method. The modulation derivation method comprises the following steps to determine the modulation order:

a. Calculate ReEfficiency=the actual payload size divided by the actual number of REs allocated for PDSCH minus REs used for the extended DCI 240.

b. Search through the RE Efficiency Colum in the following table (table 5) and find the RE Efficiency value closest to the calculated ReEfficiency (step a), the modulation order corresponding to the closest RE Efficiency is the determined modulation order for PDSCH.

TABLE 5

RE Efficiency and Modulation Order

| | Modulation Order | RE Efficiency × 256 |
|---|---|---|
| 0 | 2 | 0 |
| 1 | 4 | 378 |
| 2 | 6 | 699 |
| 3 | 8 | 1365 |

When pdschReMod=1:

The PDSCH's modulation is the same as the extended DCI's modulation, as indicated by the 2 bits of the MCS field in the basic DCI 225.

Once the PDSCH modulation is determined, the code rate is then calculated as follows:

$$R = \frac{Size_{payload}^{retran}}{N_{PDSCH}^{RE} \times M_{PDSCH}} \quad \text{formula (6)}$$

Wherein $N_{PDSCH}^{RE}$ corresponds to the number of RE for the PDSCH's user data/payload and $M_{PDSCH}$ corresponds to the modulation of the PDSCH's payload.

With all the parameters known, such as payload size, modulation and code rate, the UE can decode or encode PDSCH user data according to the existing 5GNR methods, which are well-known.

It should be noted that the above embodiments are applicable in the context of a DL or UpLink (UL) transmission.

Also, the present embodiments provide a method to extend the existing DCI capacity. The extended DCI capacity is generally enough to carry any new control information to the UE without breaking the existing PDCCH blind detection constraints.

Based on the extended DCI, more than 8 CBGs can be supported within one TB. In the extreme case, the maximum CBG number can reach the maximum CB number within one TB, i.e. implementing a CB-based HARQ and retransmission.

Based on the extended DCI, the TBS determination method can be enhanced to simultaneously fulfill the non-linear TB size over the PRB allocation and to find the same TBS indication in a retransmission as in a new transmission.

Furthermore, the method is backward compatible with the existing/current 5GNR system. For example, by keeping the existing DCI size, its structure is unchanged, the present embodiments are compatible with the current 5GNR solutions, i.e. they can be utilized with a UE without having to change the existing 5GNR standard.

Figure 8:
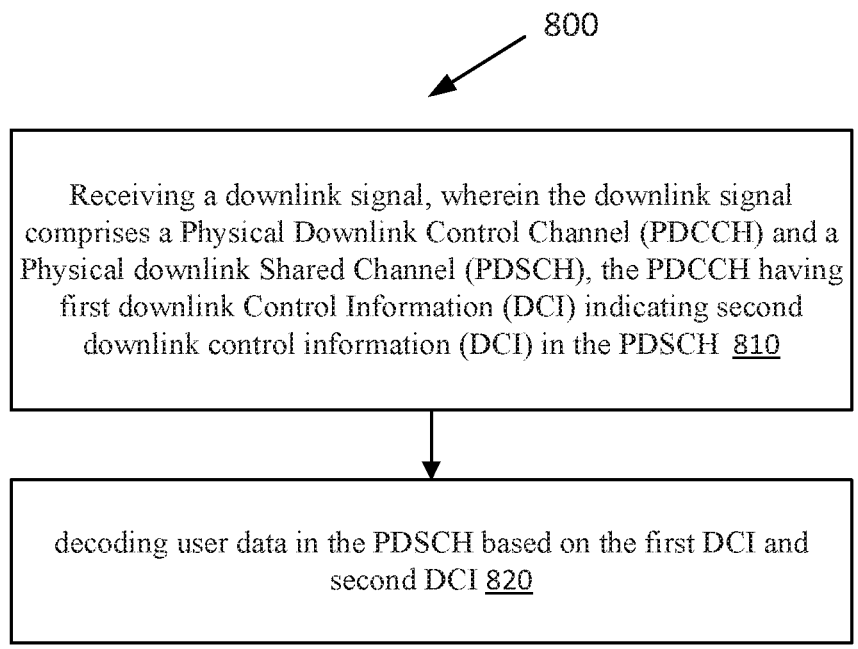
FIG. 8 is a flow chart of a method for handling user data, in accordance with some embodiments.

Turning to FIG. 8, a flow chart of a method 800 for handling user data will be described. Method 800 can be implemented in a wireless device, such as a UE, for example.

Method 800 comprises the following steps:

Step 810: Receiving a downlink signal, wherein the downlink signal comprises a Physical Downlink Control Channel (PDCCH) and a Physical downlink Shared Channel (PDSCH), the PDCCH having first downlink Control Information (DCI) indicating second downlink control information (DCI) in the PDSCH;

Step 820: Decoding user data in the PDSCH based on the first DCI and second DCI.

It should be noted that the first DCI can refer to the basic DCI 225 and the second DCI can refer to the extended DCI 240, for example.

In some embodiments, method 800 can comprise decoding the second DCI based on the first DCI.

In some embodiments, the first DCI comprises a Modulation and Coding Scheme (MCS) field which has 5 bits. For example, 2 bits of the MCS field can be used to indicate the modulation of the second DCI and the 3 remaining bits of the MCS field can be used to indicate a ratio of resource elements (RE) occupied by the second DCI.

In some embodiments, the second DCI can span a number of REs in the PDSCH from the first RE in the frequency direction first and then in the time direction until the number of REs is reached.

In some embodiments, the second DCI is used only for a retransmission of user data.

In some embodiments, the size of the second DCI depends on a redundancy version for a retransmission.

In some embodiments, the second DCI can comprise:
a first field for indicating if the same modulation is used for the second DCI and user data in the PDSCH;
a second field for indicating a Code Block Group bitmap for retransmission;
an optional third field for indicating a row index of a Transport Block Size (TBS) table;
an optional fourth field for indicating a difference between a column index of the TBS table and a nominal PRB number.

It should be noted that the first field corresponds to the pdschReMod field, the second field corresponds to the CBGRI field, the third field corresponds to the TBSI field, the fourth field corresponds to the prbOffset field.

In some embodiments, the third and fourth fields of the second DCI can be used to determine a size of a Transport Block (TB) of the original transmission.

In some embodiments, the number of REs occupied by the second DCI is determined based on the 3 bits of the MCS field of the first DCI.

In some embodiments, the wireless device may determine the number of REs by calculating the following:

$$N_{RE}^{exDCI} = \lceil N_{PRB}^{DL} \times R_{exDCIrate}^{RE} \rceil \times N_{symbol}^{RE}$$

where $N_{RE}^{exDCI}$ refers to the number of REs of the second DCI, $N_{PRB}^{DL}$ refers to an allocated Physical Resource Block (PRB) number indicated by the first DCI, $N_{symbol}^{RE}$ refers to an effective RE number per Orthogonal Frequency Division Multiplexing (OFDM) symbol within the allocated PRBs and $R_{exDCIrate}^{RE}$ refers to the 3-bit of the MCS field of the first DCI, and ⌈ ⌉ refers to a ceiling function.

In some other embodiments, the wireless device may determine the number of REs by calculating the following:

$$N_{RE}^{exDCI} = N_{RE}^{PRB} \times R_{exDCIrate}^{RE}$$

where $N_{RE}^{exDCI}$ refers to the number of REs of the second DCI, N0 is a number of RE per nominal PRBs, and $R_{exDCIrate}^{RE}$ refers to the 3-bit of the MCS field of the first DCI.

In some embodiments, the wireless device can decode the second DCI by determining a coding rate for the second DCI.

In some embodiments, the wireless device can decode the user data by determining a retransmission TB size (TBS) for the user data.

For example, determining the retransmission TBS comprises determining a TB size of an original transmission, which comprises:
- calculating a total effective RE number based on PRB allocation indicated by the first DCI;
- determining a number of nominal PRBs based on the total effective RE number;
- calculating a column index of a TBS table based on the nominal PRBs and the fourth field in the second DCI; and
- looking up the TBS using the column index and the third index as a row index to find the TBS.

The TBS table refers to Table 2, for example.

In some embodiments, the wireless device can further determine the retransmission TBS based on a Code Block Group (CBG) bitmap. For example, the CBG bitmap is given by an CBG indicator in the first DCI and the second field in the second DCI.

In some embodiments, the wireless device can decode the user data by first determining a coding rate and modulation of the user data.

In some embodiments, the wireless device can determine the modulation by determining that the first field of the second DCI is set to 1. In response to determining that the first field is set to 1, the wireless device determines that the user data have the same modulation as the second DCI.

In some embodiments, the wireless device determines the modulation by determining that the first field of the second DCI is set to 0. In response to determining that the first field is set to 0, the wireless device determines the modulation of the user data based on a modulation determination method.

Figure 9:
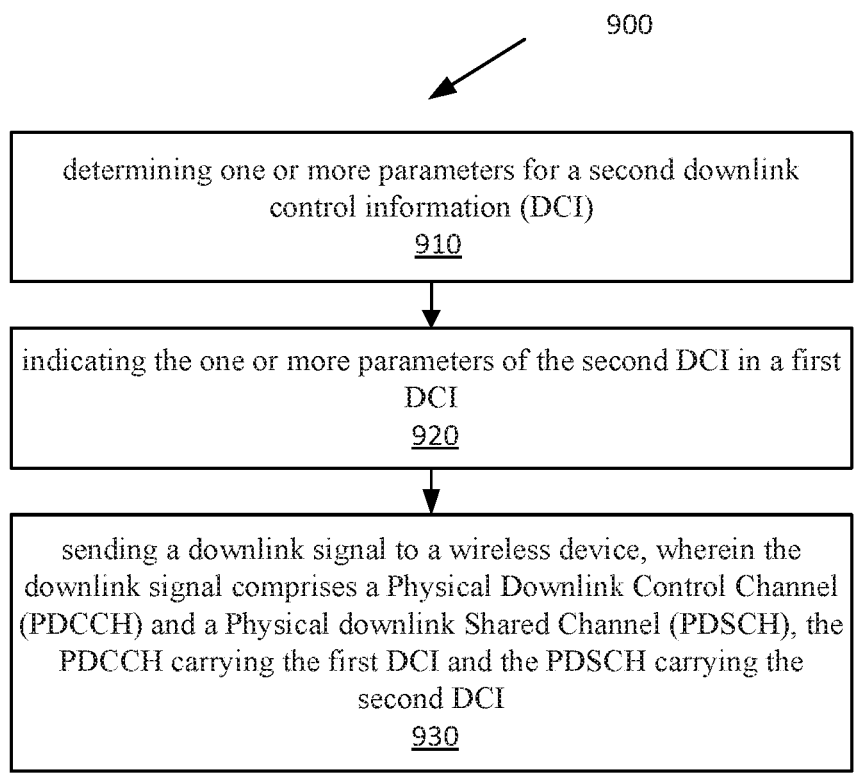
FIG. 9 is a flow chart of a method for transmitting a first DCI and a second DCI to a wireless device, in accordance with some embodiments.

Now, turning to FIG. 9, a method 900 in a network node will be described. The network node can be the gNB.

Method 900 comprises the following steps:
Step 910: determining one or more parameters for a second downlink control information (DCI);
Step 920: indicating the one or more parameters of the second DCI in a first DCI;
Step 930: sending a downlink signal to a wireless device, wherein the downlink signal comprises a Physical Downlink Control Channel (PDCCH) and a Physical downlink Shared Channel (PDSCH), the PDCCH carrying the first DCI and the PDSCH carrying the second DCI.

The first DCI corresponds to the basic DCI 225 and the second DCI corresponds to the extended DCI 240.

In some embodiments, the network node configures or enables the wireless device to have the second DCI.

In some embodiments, the one or more parameters comprise a modulation of the second DCI and a ratio of resource elements (REs) occupied by the second DCI in the PDSCH.

In some embodiments, the second DCI is only used in a retransmission of user data.

In some embodiments, the first DCI comprises a Modulation and Coding Scheme (MCS) field which has 5 bits. For example, 2 bits of the MCS field can be used to indicate the modulation of the second DCI and the remaining 3 bits of the MCS field can be used to indicate the ratio of resource elements (REs) occupied by the second DCI.

In some embodiments, the second DCI spans a number of REs in the PDSCH from the first RE in the frequency direction first and then in the time direction until the number of REs is reached.

In some embodiments, the size of the second DCI depends on a redundancy version for a retransmission.

In some embodiments, the second DCI may comprise:
- a first field for indicating if a same modulation is used for the second DCI and user data in the PDSCH;
- a second field for indicating a Code Block Group bitmap for retransmission;
- an optional third field for indicating a row index of a Transport Block Size (TBS) table;
- an optional fourth field for indicating a difference between a column index of the TBS table and a nominal PRB number.

It should be noted that the first field corresponds to the pdschReMod field, the second field corresponds to the CBGRI field, the third field corresponds to the TBSI field, the fourth field corresponds to the prbOffset field.

In some embodiments, the third and fourth fields of the second DCI are used to determine a size of a Transport Block (TB) of an original transmission.

In some other embodiments, the second DCI may comprise: a first field for indicating if a same modulation is used for the second DCI and user data in the PDSCH; a second field for indicating a Code Block Group bitmap for retransmission; and an optional third field for indicating a TBS of an original transmission using a one-dimensional TBS table. For example, the first field corresponds to the pdschReMod field, the second field corresponds to the CBGRI field. The third field may correspond to TBS_ID which can be used to determine the TBS of the original transmission based the one-dimensional table, which corresponds to Table 3.

Figure 10:
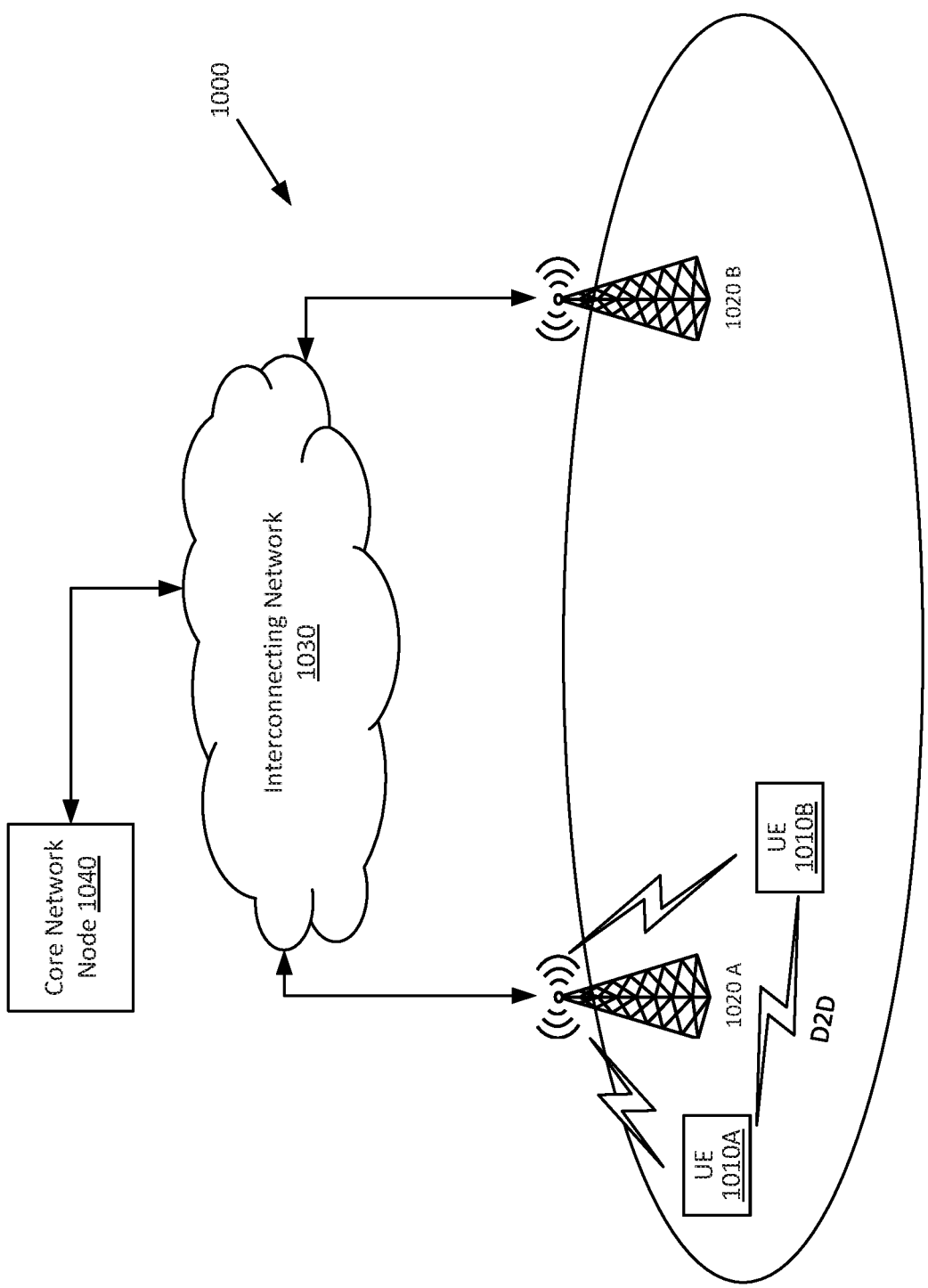
FIG. 10 illustrates one example of a wireless communications system in which embodiments of the present disclosure may be implemented.

The present disclosure contemplates that the various embodiments described herein may be applied to a variety of networks such as the one shown in FIG. 10.

FIG. 10 illustrates an example of a wireless network 1000 that may be used for wireless communications. Wireless network 1000 includes UEs 1010A-1010B (collectively referred to as UE or UEs 1010) and a plurality of radio network nodes 1020A-1020B (e.g., Node Bs (NBs) Radio Network Controllers (RNCs), evolved NBs (eNBs), next generation NB (gNBs), etc.) (collectively referred to as network nodes 1020) directly or indirectly connected to a core network 1030 which may comprise various core network nodes. For example, the UE 1010 are the same as the UE 605, and the gNB 1020 area the same as the gNB 610, as illustrated in FIG. 6. The network 1000 may use any suitable radio access network (RAN) deployment scenarios, including Universal Mobile Telecommunication System (UMTS) Terrestrial Radio Access Network (UTRAN), and Evolved UMTS Terrestrial Radio Access Network (EU-TRAN). UEs 1010A and 1010B may each be capable of communicating directly with radio network nodes 1020 over a wireless interface. In certain embodiments, UEs may also be capable of communicating with each other via device-to-device (D2D) communication. In certain embodiments, network nodes 1020 may also be capable of communicating with each other, e.g. via an interface (e.g. X2 in LTE or other suitable interface).

As an example, UE 1010A may communicate with radio network node 1050 over a wireless interface. That is, UE 1010A may transmit wireless signals to and/or receive wireless signals from radio network node 1020. The wireless signals may contain voice traffic, data traffic, control signals, and/or any other suitable information.

It should be noted that a UE 1010 may be a wireless device, a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), Universal Serial Bus (USB) dongles, Customer Premises Equipment (CPE) etc. Example embodiments of a wireless device 1010 or 605 are described in more detail below with respect to FIGS. 11 and 12.

In some embodiments, the "network node" can be any kind of network node which may comprise of a radio network node such as a radio access node (which can include a base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU), Remote Radio Head (RRH), a multi-standard BS (also known as MSR BS), etc.), a core network node (e.g., MME, SON node, a coordinating node, positioning node, MDT node, etc.), or even an external node (e.g., 3rd party node, a node external to the current network), etc. The network node may also comprise a test equipment.

In certain embodiments, network nodes 1020 may interface with a radio network controller (not shown). The radio network controller may control network nodes 1020 and may provide certain radio resource management functions, mobility management functions, and/or other suitable functions. In certain embodiments, the functions of the radio network controller may be included in the network node 1020. The radio network controller may interface with the core network node 1040. In certain embodiments, the radio network controller may interface with the core network node 1040 via the interconnecting network 1030.

The interconnecting network 1030 may refer to any interconnecting system capable of transmitting audio, video, signals, data, messages, or any combination of the preceding. The interconnecting network 1030 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 1040 may manage the establishment of communication sessions and various other functionalities for wireless devices 1010. Examples of core network node 1040 may include MSC, MME, SGW, PGW, O&M, OSS, SON, positioning node (e.g. E-SMLC), MDT node, etc. Wireless devices 1010 may exchange certain signals with the core network node 1040 using the non-access stratum layer. In non-access stratum signaling, signals between wireless devices 1010 and the core network node 1040 may be transparently passed through the radio access network. In certain embodiments, network nodes 1020 may interface with one or more other network nodes over an internode interface. For example, network nodes 1050 may interface each other over an X2 interface.

Although FIG. 10 illustrates a particular arrangement of network 1000, the present disclosure contemplates that the various embodiments described herein may be applied to a variety of networks having any suitable configuration. For example, network 1000 may include any suitable number of wireless devices 1010 and network nodes 1020, as well as any additional elements suitable to support communication between wireless devices or between a wireless device and another communication device (such as a landline telephone). The embodiments may be implemented in any appropriate type of telecommunication system supporting any suitable communication standards and using any suitable components and are applicable to any radio access technology (RAT) or multi-RAT systems in which the wireless device receives and/or transmits signals (e.g., data). While certain embodiments are described for NR and/or LTE, the embodiments may be applicable to any RAT, such as UTRA, E-UTRA, narrow band internet of things (NB-IoT), WiFi, Bluetooth, next generation RAT (NR, NX), 4G, 5G, LTE FDD/TDD, etc.

Figure 11:
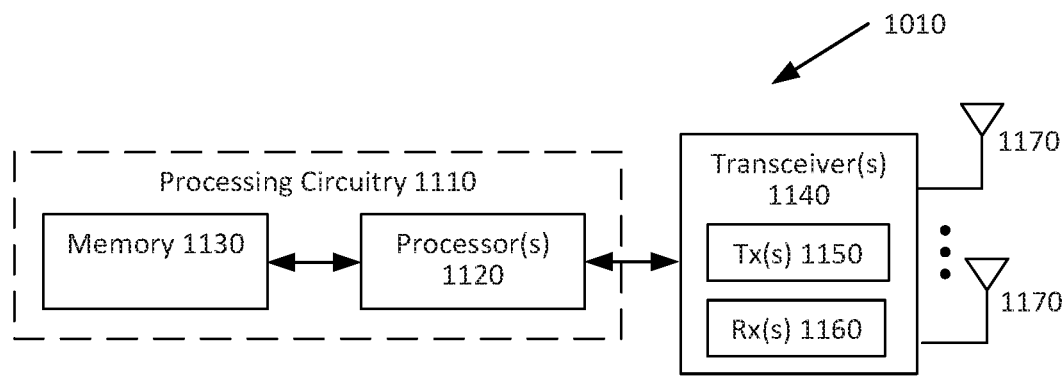
FIGS. 11 and 12 are block diagrams that illustrate a wireless device according to some embodiments of the present disclosure.

FIG. 11 is a schematic block diagram of the wireless device 1010 according to some embodiments of the present disclosure. As illustrated, the wireless device 1010 includes circuitry/circuit 1110 comprising one or more processors 1120 (e.g., Central Processing Units (CPUs), Application Specific Integrated Circuits (ASICs), Field Programmable Gate Arrays (FPGAs), and/or the like) and memory 1130. The wireless device 1010 also includes one or more transceivers 1140 each including one or more transmitter 1150 and one or more receivers 1160 coupled to one or more antennas 1170. In some embodiments, the functionality of the wireless device 1010 described above may be fully or partially implemented in software that is, e.g., stored in the memory 1130 and executed by the processor(s) 1120. For example, the processor 1120 is configured to perform method 800 of FIG. 8.

In some embodiments, a computer program including instructions which, when executed by the at least one processor 1120, causes the at least one processor 1120 to carry out the functionality of the wireless device 1010 according to any of the embodiments described herein is provided (e.g. method 800 of FIG. 8). In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 12:
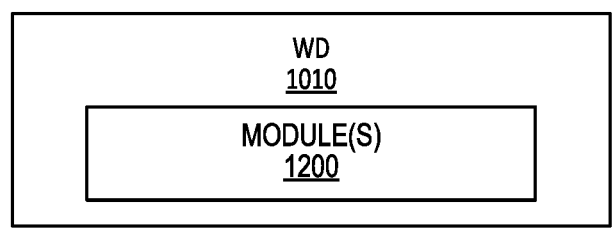

FIG. 12 is a schematic block diagram of the wireless device 1010 according to some other embodiments of the present disclosure. The wireless device 1010 includes one or more modules 1200, each of which is implemented in software. The module(s) 1200 provide the functionality of the wireless device 1010 described herein.

The module(s) 1200 may comprise, for example, a receiving module operable to perform step 810 of FIG. 8. The module(s) 1200 may further comprise a decoding module operable to perform step 820 of FIG. 8.

Figure 13:
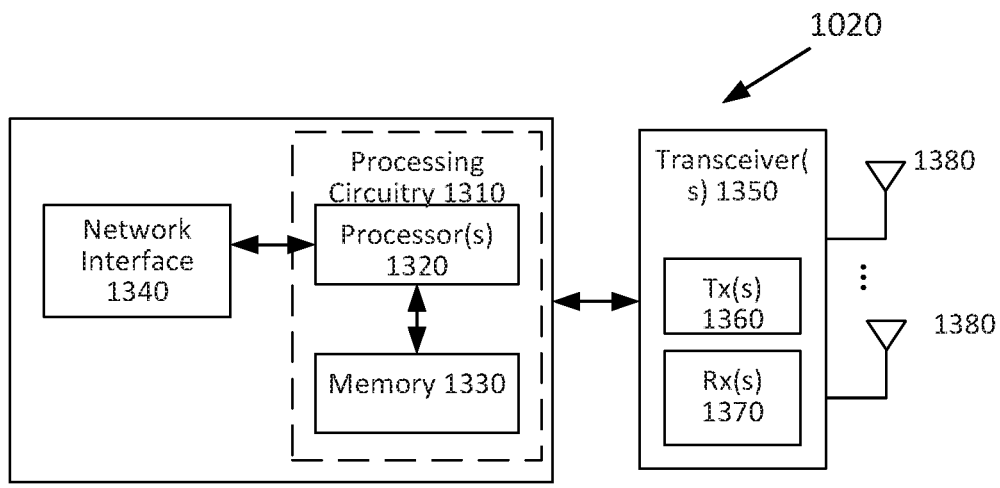
FIGS. 13 and 14 are block diagrams that illustrate a network node according to some embodiments of the present disclosure.

FIG. 13 is a schematic block diagram of a network node 1020 according to some embodiments of the present disclosure. As illustrated, the network node 1020 includes a processing circuitry/circuit 1310 comprising one or more processors 1320 (e.g., CPUs, ASICs, FPGAs, and/or the like) and memory 1330. The network node also comprises a network interface 1340. The network node 1020 also includes one or more transceivers 1350 that each include one or more transmitters 1360 and one or more receivers 1370 coupled to one or more antennas 1380. In some embodiments, the functionality of the network node 1020 described above may be fully or partially implemented in software that is, e.g., stored in the memory 1330 and executed by the processor(s) 1320. For example, the processor 1320 can be configured to perform method 900 of FIG. 9.

Figure 14:
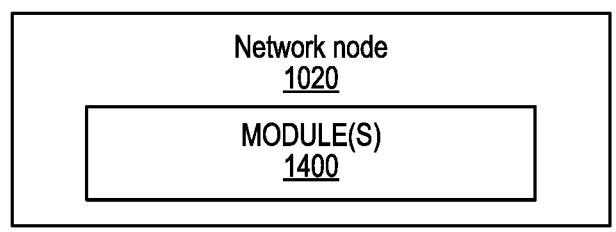

FIG. 14 is a schematic block diagram of the network node 1020 according to some other embodiments of the present disclosure. The network node 1020 includes one or more modules 1400, each of which is implemented in software. The module(s) 1400 provide the functionality of the network node 1020 described herein. The module(s) 1400 may comprise, for example, a determining module operable to perform step 910 of FIG. 9, an indicating module operable to perform step 920 of FIG. 9 and a sending module operable to perform step 930 of FIG. 9.

Figure 15:
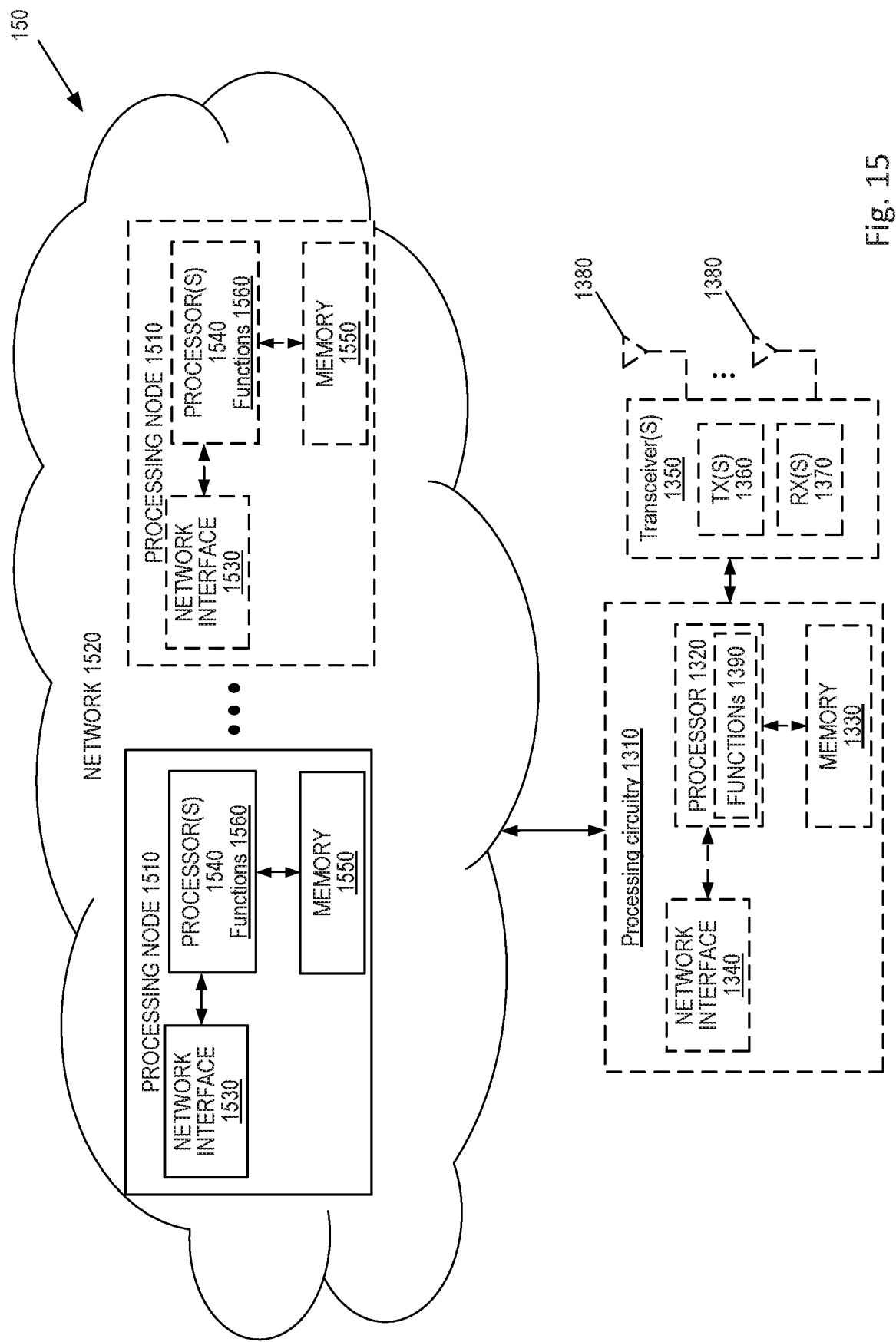
FIG. 15 illustrates a virtualized environment of a network node, according to some embodiments of the present disclosure.

FIG. 15 is a schematic block diagram 1500 that illustrates a virtualized embodiment of the network node 1020, according to some embodiments of the present disclosure. As used herein, a "virtualized" network node 1500 is a network node 1500 in which at least a portion of the functionality of the network node 1500 is implemented as a virtual component (e.g., via a virtual machine(s) executing on a physical processing node(s) in a network(s)). As illustrated, if the network node 1500 is the radio access node 1020, the network node 1500 also includes the one or more transceivers 1350, as described with respect to FIG. 13. The network node 1500 includes one or more processing nodes 1510 coupled to or included as part of a network(s) 1520 via the network interface 1530. Alternatively, all of the functionality of the network node 1500 described herein may be implemented in the processing nodes 1510. Each processing node 1510 includes one or more processors 1540 (e.g., CPUs, ASICs, FPGAs, and/or the like), memory 1550, and a network interface 1530.

In this example, functions 1560 of the network node 1500 described herein are implemented at the one or more processing nodes 1540 in any desired manner. In some particular embodiments, some or all of the functions 1560 of the network node 1500 described herein are implemented as virtual components executed by one or more virtual machines implemented in a virtual environment(s) hosted by the processing node(s) 1540. As will be appreciated by one of ordinary skill in the art, additional signaling or communication between the processing node(s) 1560 and the transceivers 1350 (if present) is used in order to carry out at least some of the desired functions.

It should be noted that the communication system 1000 may itself be connected to a host computer, which may be embodied in the hardware and/or software of a standalone server, a cloud-implemented server, a distributed server or as processing resources in a server farm. The host computer may be under the ownership or control of a service provider or may be operated by the service provider or on behalf of the service provider. Connections between the communication system 1000 and the host computer may extend directly from the core network 1040 to the host computer or may extend via an optional intermediate network such as 1030. The intermediate network 1030 may be one of, or a combination of more than one of, a public, private or hosted network. The intermediate network 1030, if any, may be a backbone network or the Internet. In some embodiments, the intermediate network 1030 may comprise two or more sub-networks (not shown).

The communication system 1000 as a whole may enable connectivity between one of the connected UEs 1010a, 1010b and the host computer. The connectivity may be described as an over-the-top (OTT) connection. The host computer and the connected UEs 1010a, 1010b are configured to communicate data and/or signaling via the OTT connection, using the access network (through the base stations 1020a and 1020b, for example), the core network 1040, any intermediate network 1030 and possible further infrastructure (not shown) as intermediaries. The OTT connection may be transparent in the sense that at least some of the participating communication devices through which the OTT connection passes are unaware of routing of uplink and downlink communications. For example, a network node 1020a may not or need not be informed about the past routing of an incoming downlink communication with data originating from a host computer to be forwarded (e.g., handed over) to a connected UE 1010a. Similarly, the network node 1020a needs not be aware of the future routing of an outgoing uplink communication originating from the UE 1010a towards the host computer.

In some embodiments, a carrier comprising the aforementioned computer program product is provided. The carrier is one of an electronic signal, an optical signal, a radio signal, or a computer readable storage medium (e.g., a non-transitory computer readable medium such as memory).

Some embodiments may be represented as a non-transitory software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description, which is defined solely by the appended claims.

What is claimed is:

1. A method in a wireless device comprising:
    receiving a downlink signal, the downlink signal comprising a Physical Downlink Control Channel (PDCCH) and a Physical downlink Shared Channel (PDSCH), the PDCCH having first downlink Control Information (DCI) indicating at least second downlink control information (DCI) in the PDSCH;
    performing one of encoding and decoding user data in the PDSCH based on the first DCI and second DCI the first DCI comprising a Modulation and Coding Scheme, MCS, field which has 5 bits, and the 3 bits of the MCS field being used to indicate a ratio of resource elements, RE, used for the second DCI over an effective RE number in allocated Physical Resource blocks, PRBs; and
    determining a number of REs occupied by the second DCI based on the 3 bits of the MCS field of the first DCI by calculating the following:

$$N_{RE}^{exDCI} = \lceil N_{PRB}^{DL} \times R_{exDCIrate}^{RE} \rceil \times N_{symbol}^{RE}$$

where $N_{RE}^{exDCI}$ refers to the number of REs of the second DCI, $N_{PRB}^{DL}$ refers to an allocated Physical Resource Block, PRB, number indicated by the first DCI, $N_{symbol}^{RE}$ refers to an effective RE number per Orthogonal Frequency Division Multiplexing, OFDM, symbol within the allocated PRBs and $R_{exDCIrate}^{RE}$ refers to the 3-bit of the MCS field of the first DCI, and ⌈ ⌉ refers to a ceiling function.

2. The method of claim 1, further comprising decoding the second DCI based on the first DCI.

3. The method of claim 1, wherein 2 bits of the MCS field are used to indicate a modulation of the second DCI.

4. The method of claim 1, wherein the second DCI spans a number of REs in the PDSCH from a first RE in a frequency direction first and then in a time direction until the number of REs is reached.

5. The method of claim 1, wherein determining the number of REs comprises calculating the following:

$$N_{RE}^{exDCI} = N_{RE}^{PRB} \times R_{exDCIrate}^{RE}$$

Where $N_{RE}^{exDCI}$ refers to the number of REs of the second DCI, $N_{RE}^{PRB}$ is a number of RE per nominal PRBs, and $R_{exDCIrate}^{RE}$ refers to the 3-bit of the MCS field of the first DCI.

6. The method of claim 2, wherein decoding the second DCI comprises determining a coding rate for the second DCI.

7. The method of claim 1, wherein performing one of encoding and decoding the user data further comprises determining a coding rate.

8. A wireless device comprising:
a communication interface; and
a processing circuit communicatively connected to the communication interface, and configured to:
receive a downlink signal, wherein the downlink signal comprises a Physical Downlink Control Channel (PDCCH) and a Physical downlink Shared Channel (PDSCH), the PDCCH having first downlink Control Information (DCI) indicating second downlink control information (DCI) in the PDSCH;
perform one of encoding and decoding user data in the PDSCH based on the first DCI and second DCI the first DCI comprising a Modulation and Coding Scheme, MCS, field which has 5 bits, and 3 bits of the MCS field being used to indicate a ratio of resource elements, RE, used for the second DCI over an effective RE number in allocated Physical Resource blocks, PRBs; and
determine a number of REs occupied by the second DCI based on the 3 bits of the MCS field of the first DCI by calculating the following:

$$N_{RE}^{exDCI} = \lceil N_{PRB}^{DL} \times R_{exDCIrate}^{RE} \rceil \times N_{symbol}^{RE}$$

where $N_{RE}^{exDCI}$ refers to the number of REs of the second DCI, $N_{PRB}^{DL}$ refers to an allocated Physical Resource Block, PRB, number indicated by the first DCI, $N_{symbol}^{RE}$ refers to an effective RE number per Orthogonal Frequency Division Multiplexing, OFDM, symbol within the allocated PRBs and $R_{exDCIrate}^{RE}$ refers to the 3-bit of the MCS field of the first DCI, and $\rceil \lceil$ refers to a ceiling function.

9. The wireless device of claim 8, wherein the processing circuit is configured to decode the second DCI based on the first DCI.

10. The wireless device of claim 8, wherein 2 bits of the MCS field are used to indicate a modulation of the second DCI.

11. The wireless device of claim 8, wherein the second DCI spans a number of REs in the PDSCH from a first RE in a frequency direction first and then in a time direction until the number of REs is reached.

12. The wireless device of claim 8, wherein the processing circuit is configured to determine the number of REs by calculating the following:

$$N_{RE}^{exDCI} = N_{RE}^{PRB} \times R_{exDCIrate}^{RE}$$

where $N_{RE}^{exDCI}$ refers to the number of REs of the second DCI, $N_{RE}^{PRB}$ is a number of RE per nominal PRBs, and $R_{exDCIrate}^{RE}$ refers to the 3-bit of the MCS field of the first DCI.

13. The wireless device of claim 9, wherein the processing circuit is configured to decode the second DCI by determining a coding rate for the second DCI.

14. The wireless device of claim 8, wherein the processing circuit is configured to perform one of encoding and decoding the user data by determining a coding rate.

* * * * *